US010819589B2

(12) United States Patent
Raskar (10) Patent No.: US 10,819,589 B2
(45) Date of Patent: Oct. 27, 2020

(54) SYSTEM AND A METHOD FOR OPTIMIZED SERVER-LESS SERVICE VIRTUALIZATION

(71) Applicant: Cognizant Technology Solutions India Pvt. Ltd., Chennai (IN)

(72) Inventor: Hemant Raskar, Pune (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 19 days.

(21) Appl. No.: 16/242,210

(22) Filed: Jan. 8, 2019

(65) Prior Publication Data
US 2020/0136933 A1    Apr. 30, 2020

(30) Foreign Application Priority Data
Oct. 24, 2018  (IN) .............................. 201841040180

(51) Int. Cl.
*G06F 15/173* (2006.01)
*H04L 12/24* (2006.01)
*H04L 29/08* (2006.01)
*G06F 9/50* (2006.01)
(Continued)

(52) U.S. Cl.
CPC ...... *H04L 41/5054* (2013.01); *G06F 9/45558* (2013.01); *G06F 9/5077* (2013.01); *G06F 9/52* (2013.01); *H04L 41/0806* (2013.01); *H04L 41/5012* (2013.01); *H04L 41/5058* (2013.01); *H04L 67/16* (2013.01); *H04L 67/32* (2013.01);
(Continued)

(58) Field of Classification Search
CPC ............. H04L 41/5054; H04L 41/0806; H04L 41/5012; H04L 41/5058; H04L 67/16; H04L 67/32; G06F 9/45558; G06F 9/5077; G06F 9/52; G06F 2009/45562; G06F 2009/45583; G06F 2209/5011
USPC ........................................................ 709/226
See application file for complete search history.

(56) References Cited

U.S. PATENT DOCUMENTS 9,582,399 B2   2/2017  Versteeg
9,659,251 B2 * 5/2017  Tang ....................... H04L 41/00
9,665,437 B2 * 5/2017  Bhargava ............ G06F 11/1451
(Continued)

OTHER PUBLICATIONS

TCS/ Serverless Computing: A Compelling Opportunity for Today's Digital Enterprise, Tata Consultancy Services Ltd, Internet URL: https://www.tcs.com/content/dam/tcs/pdf/technologies/cloud/abstract/Serverless%20Computing.pdf, Jan. 2017.

*Primary Examiner* — Melvin H Pollack
(74) *Attorney, Agent, or Firm* — Cantor Colburn LLP (57) ABSTRACT

A system and a method for providing service virtualization in a distributed computing architecture without a central server is disclosed. The present invention provides one or more service pods implementable on one or more workstations. Each of the one or more service pods is configured to host one or more virtual services. Each of the one or more service pods interface with one or more live services to generate virtual service data to emulate said live services. The one or more service pods interface with each other via a network fabric technique and interact with one or more client applications to be tested. Each of the one or more service pods are configured to receive and process requests from one or more client applications using various modes of service pods. The present invention provides complete abstraction of the one or more workstations from the one or more service pods.

30 Claims, 3 Drawing Sheets

(51) Int. Cl.
 *G06F 9/52* (2006.01)
 *G06F 9/455* (2018.01)
(52) U.S. Cl.
 CPC .............. *G06F 2009/45562* (2013.01); *G06F 2009/45583* (2013.01); *G06F 2209/5011* (2013.01)

(56) References Cited

U.S. PATENT DOCUMENTS

| | | | | |
|---|---|---|---|---|
| 9,672,071 | B2* | 6/2017 | Gerganov | G06F 9/5027 |
| 9,699,213 | B2* | 7/2017 | Nagaratnam | G06F 21/62 |
| 9,942,099 | B2* | 4/2018 | Aldrin | H04L 41/12 |
| 10,044,566 | B1* | 8/2018 | Grisco | G06F 16/2282 |
| 10,212,045 | B2* | 2/2019 | Strandzhev | H04L 67/10 |
| 10,310,760 | B1* | 6/2019 | Dreier | G06F 3/0631 |
| 10,334,058 | B2* | 6/2019 | Frank | H04L 67/16 |
| 10,338,969 | B2* | 7/2019 | Wilkinson | H04L 67/16 |
| 10,339,039 | B2* | 7/2019 | Raheja | G06F 9/466 |
| 10,353,729 | B1* | 7/2019 | Bell | G06F 8/31 |
| 10,397,051 | B1* | 8/2019 | Featonby | H04L 41/08 |
| 10,417,025 | B2* | 9/2019 | Bosch | H04W 4/60 |
| 10,423,437 | B2* | 9/2019 | Kaplan | G06F 9/45558 |
| 10,491,705 | B2* | 11/2019 | Oetting | H04L 67/32 |
| 10,503,427 | B2* | 12/2019 | Botes | G06F 3/065 |
| 10,534,629 | B1* | 1/2020 | St. Pierre | G06F 9/45558 |
| 10,541,928 | B2* | 1/2020 | Shih | H04L 47/2475 |
| 2016/0212012 | A1* | 7/2016 | Young | H04L 41/14 |
| 2016/0277510 | A1* | 9/2016 | Du | H04L 67/16 |
| 2017/0116878 | A1 | 4/2017 | Shokite | |
| 2017/0163732 | A1* | 6/2017 | Saraf | H04L 67/1097 |
| 2017/0171034 | A1* | 6/2017 | Lucas | G06F 3/0482 |
| 2017/0230257 | A1* | 8/2017 | Bruun | G06F 9/44505 |
| 2018/0074843 | A1* | 3/2018 | Smith | G06F 9/45558 |
| 2018/0077080 | A1 | 3/2018 | Gazier | |
| 2018/0295134 | A1* | 10/2018 | Gupta | H04L 63/0815 |
| 2019/0227781 | A1* | 7/2019 | Ramasamy | G06F 8/65 |
| 2019/0272260 | A1* | 9/2019 | Kinney, Jr. | G06F 16/1873 |
| 2019/0278624 | A1* | 9/2019 | Bade | G06F 3/0659 |
| 2019/0286373 | A1* | 9/2019 | Karumbunathan | G06F 3/0661 |
| 2019/0347120 | A1* | 11/2019 | Kottomtharayil | G06F 9/45533 |
| 2019/0347127 | A1* | 11/2019 | Coady | G06F 9/45558 |
| 2019/0361697 | A1* | 11/2019 | Hu | G06F 8/433 |
| 2019/0370049 | A1* | 12/2019 | Gopalan | G06F 9/45558 |
| 2019/0394219 | A1* | 12/2019 | Huang | G06F 9/45558 |
| 2020/0059401 | A1* | 2/2020 | Holmes | H04L 41/0803 |
| 2020/0065086 | A1* | 2/2020 | Woodmansee | H04L 41/082 |
| 2020/0065128 | A1* | 2/2020 | Nag | G06N 3/08 |
| 2020/0073739 | A1* | 3/2020 | Rungta | G06F 11/1484 |

* cited by examiner

SYSTEM AND A METHOD FOR OPTIMIZED SERVER-LESS SERVICE VIRTUALIZATION

FIELD OF THE INVENTION

The present invention relates generally to service virtualization. More particularly, the present invention relates to a system and a method for providing an optimized Server-less Service Virtualization without the need of a host central server.

BACKGROUND OF THE INVENTION

Modern complex software systems are dependent on one or more hardware or software components and one or more third party services in order to perform their defined function. However, several issues may arise during testing of complex systems due to unavailability of dependent components. For instance, systems like mainframes and dependency on third Party Services may lead to delay in projects.

Service Virtualization is one of the existing approaches to overcome the above described problem. Service Virtualization emulates behavior, data and performance of one or more component on which the developing software depends. Service virtualization aids in faster testing, integration and release processes, with better quality and lower cost.

Existing techniques of service virtualization are implemented via a central host server. The host server provides all the expected functionalities of a service virtualization platform such as deploying and hosting virtual services, managing license concurrency, allowing multiple client logins, accepting requests from multiple client applications managing different types of virtual services etc. However, implementing service virtualization via a central server includes expensive hardware setup, increased time to setup and manage central server, expensive license requirements, downtime replacements, unnecessary time consumption while hosting new version of virtual services due to pre-defined service virtualization process etc.

Further, maintaining performance of virtual services up to a certain level requires computing power of host server to be increased, which adds a huge cost. Furthermore, virtualization via central server impacts hosting of multiple versioned virtual services due to limitation on ports and firewalls. Yet further, implementation via central server reduces flexibility of hosting virtual services as per individual needs and requires more hardware licenses leading to more cost.

In light of the above drawbacks, there is a need for a system and a method which provides service virtualization without the need of a central server. There is a need for a system and a method which provides for virtual services for testing applications without the need of a physical central server. There is a need for a system and a method which can be hosted and used without any downtime. Further, there is a need for a system and a method which is flexible and can be managed and controlled as per individual requirements. Yet further, there is a need for a system and a method which is more agile and responsive. Yet further, there is a need for a system and a method which can be easily deployed and maintained without incurring high expenses.

SUMMARY OF THE INVENTION

A system for server less service virtualisation is provided. In various embodiments of the present invention, the system is implementable on one or more workstations in a distributed computing architecture. The one or more workstations interfaces with one or more application servers and one or more dependency components. Each of the one or more workstations comprises a memory storing program instructions, a processor configured to execute program instructions stored in the memory, and at least one virtual service subsystem in communication with the processor. The virtual service subsystem is configured to host a plurality of virtual services emulating one or more live services hosted by one or more dependency components. Each of the plurality of virtual services are interconnected via a network fabric technique. Further, the virtual service subsystem is configured to generate a system-meta-data using a computation technique. The system-meta-data comprises a fabric access table to enable communication between each of the plurality of virtual services. Furthermore, the virtual service subsystem is configured to determine availability of one or more live services for completing one or more service requests received from one or more client applications via the one or more application servers. Finally, the virtual service subsystem is configured to determine one or more virtual services in the absence of one or more corresponding live services to complete the one or more service requests based on the system meta-data.

A method for server-less service virtualization in a distributed computing architecture is provided. In various embodiments of the present invention, the method is implemented by at least one workstation comprising at least one processor executing program instructions stored in a memory. The method comprises hosting, by a processor, a plurality of virtual services emulating one or more live services hosted by one or more dependency components. Each of the plurality of virtual services are interconnected via a network fabric technique. Further, the method comprises generating, by the processor, a system-meta-data using a computation technique, wherein the system-meta-data comprises a fabric access table to enable communication between each of the plurality of virtual services. Furthermore, the method comprises determining, by the processor, availability of one or more live services for completing one or more service requests received from one or more client applications via the one or more application servers. Finally, the method comprises determining, by the processor, one or more virtual services in the absence of one or more corresponding live services to complete the one or more service requests based on the system meta-data.

A computer program product is provided. The computer program product comprises a non-transitory computer-readable medium having computer-readable program code stored thereon, the computer-readable program code comprising instructions that, when executed by a processor, cause the processor to host a plurality of virtual services emulating one or more live services hosted by one or more dependency components. Each of the plurality of virtual services are interconnected via a network fabric technique. Further, a system-meta-data is generated using a computation technique. The system-meta-data comprises a fabric access table to enable communication between each of the plurality of virtual services. Further, availability of one or more live services for completing one or more service requests received from one or more client applications is determined via the one or more application servers. Finally, one or more virtual services in the absence of one or more corresponding live services are determined to complete the one or more service requests based on the system meta-data.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for providing service virtualization in a distributed computing architecture without a central server. In particular, the present invention provides for virtual services for testing applications in a distributed computing architecture without the need of a physical central server. The system and method of the present invention provides one or more service pods implementable on one or more workstations. Each of the one or more service pods is configured to host one or more virtual services. In particular, each of the one or more service pods interface with one or more live services to generate virtual service data associated with respective live services. The virtual service data corresponding to respective live services is representative of responses, requests, rules, configurations, business use cases and results which emulate corresponding live service. The one or more service pods interface with each other via a network fabric technique. Further, each of the one or more service pods are accessible by one or more client applications to be tested. Each of the one or more service pods are configured to receive and process requests from one or more client applications using various modes of service pods. The present invention enables service virtualisation without a central server and provides complete abstraction of the one or more workstations from the one or more service pods. Further, the present invention provides optimized data transmission between the one or more service pods and the one or more client applications via the network fabric technique.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
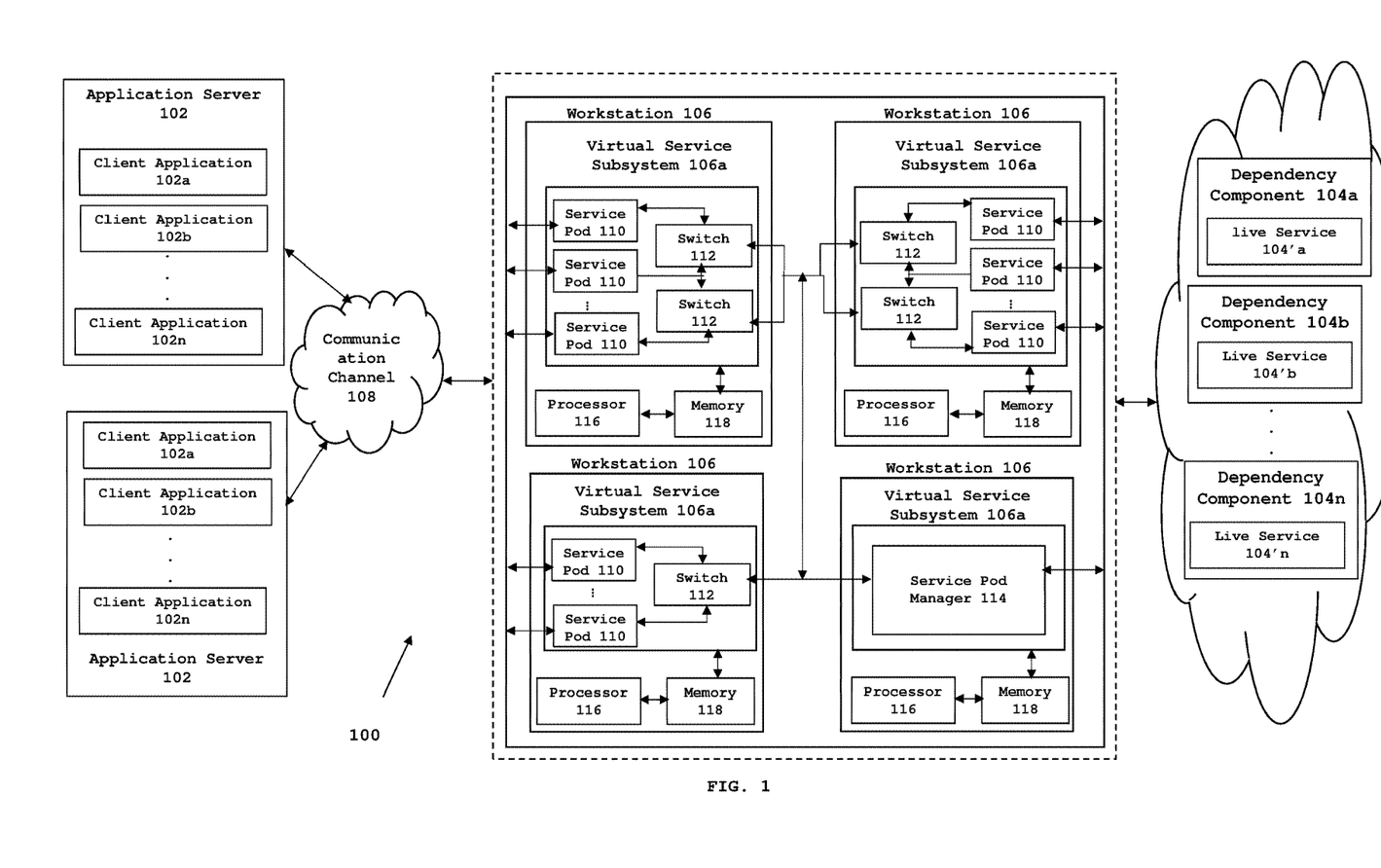
FIG. 1 illustrates a block diagram of a system environment for providing server-less service virtualization in a distributed computing architecture, in accordance with various embodiments of the present invention.

FIG. 1 illustrates a block diagram of a system environment for providing server-less service virtualization in a distributed computing architecture, in accordance with various embodiments of the present invention.

Referring to FIG. 1, in an embodiment of the present invention, the system environment 100 comprises one or more application servers 102 including one or more client applications 102a, 102b . . . 102n; one or more dependency components 104a, 104b . . . 104n including one or more live services 104'a, 104'b . . . 104'n, and one or more workstations 106 comprising respective virtual service subsystems 106a configured to host and/or manage virtual services.

In various embodiments of the present invention, the one or more application servers 102 may include but are not limited to a server computer, a microcomputer or any other wired or wireless processing device capable of developing and executing one or more client applications. In an exemplary embodiment of the present invention, as shown in FIG. 1, one or more application servers interface with one or more workstations 106 over a communication channel 108. The communication channel 108 may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), and a Wide Area Network (WAN). Each of the one or more application servers 102 comprises one or more client applications to be tested. In an exemplary embodiment of the present invention, as shown in FIG. 1, each application server 102 includes one or more client applications 102a, 102b . . . 102n, respectively.

In various embodiments of the present invention, the one or more dependency components 104a, 104b . . . 104n may include but are not limited to mail servers, web servers, game servers, data servers, FTP servers, LDAP servers and application servers. Further, the one or more dependency components 104a, 1041a . . . 104n include one or more live services 104'a, 104'b . . . 104'n. In an exemplary embodiment of the present invention, the one or more live services may be selected from, but is not limited to SOAP services such as http, JMS, JDBC, FTP, SOAP, REST, FIX, LDAP and RMI.

In various embodiments of the present invention, the one or more workstations 106 may include but are not limited to a computer, a microcomputer or any other wired or wireless processing device capable of executing instruction. In an exemplary embodiment of the present invention, as shown in FIG. 1, the one or more workstations 106 interface with one or more application servers 102 and one or more dependency components 104a, 104b . . . 104n in the distributed computing architecture. In particular, each of the one or more workstations 102 comprises at least one virtual service subsystems 106a, a processor 116 and a memory 118. In an embodiment of the present invention, the at least one virtual service subsystem 106a is configured to host one or more virtual services which emulate one or more live services 104'a, 104'b . . . 104'n. The at least one virtual service subsystem is configured to receive service requests initiated by the one or more client applications 102a, 102b . . . 102n from the one or more application servers 102. The service requests are associated with functionality provided by the one or more live services. The at least one virtual service subsystem 106 accordingly manages one or more virtual services to complete the service requests initiated by the one or more client applications 102a, 102b . . . 102n. In an embodiment of the present invention, as shown in FIG. 1, the at least one virtual service subsystem 106a interfaces with one or more dependency components 104a, 104b . . . 104n including one or more live services 104'a, 104'b . . . 104'n to generate or update virtual service data associated with corresponding live service 104'a, 104'b . . . 104'n. The virtual service data corresponding to respective live services is representative of responses, requests, rules, configurations, business use cases and results which emulate corresponding live service. In another embodiment of the present invention, the at least one virtual service subsystem 106a is configured to perform a check to determine if the one or more live services 104'a, 104'b . . . 104'n are serviceable and accordingly route one or more incoming service requests to the corresponding one or more live services 104'a, 104'b . . . 104'n. Further, the at least one virtual service subsystem 106a is configured to record responses from the corresponding live services 104'a, 104'b . . . 104'n to generate virtual service data. The at least one virtual service subsystem 106a routes the one or more incoming service requests to the corresponding one or more virtual services if it is determined that the one or more live services 104'a, 104'b . . . 104'n are not serviceable.

Each of the at least one virtual service subsystem 106a comprises at least one of: one or more service pods 110, one or more crossbar switches 112 and a service pod manager 114. In another embodiment of the present invention as shown in FIG. 1, the at least one virtual service subsystem 106a may comprise a plurality of service pods 110. The various units of the virtual service subsystem 106a which include service pods 110, crossbar switches 112 and service pod manager 114 are operated via the processor 116 specifically programmed to execute instructions stored in the memory 118 for executing respective functionalities of the units of the subsystem 106a in accordance with various embodiments of the present invention.

In an embodiment of the present invention, each crossbar switch 112 is a self-learning engine and may be deployed in the virtual service subsystem 106a as an independent unit separate from the one or more service pods 110 and the service pod manager 114. The one or more crossbar switches 112 enables deployment of multiple service pods 110 on a single subsystem by creating an elastic network fabric (explained later in the specification). In particular, each crossbar switch 112 is configured to provide routing and communication between the one or more service pods 110 using a one or more techniques. In particular, each cross bar switch 112 is configured to provide a gateway to manage and enable inter-service-pod traffic. In an exemplary embodiment of the present invention, the one or more techniques for enabling communication between one or more service pods 110 include communication via Transmission Control Protocol (TCP). Further, the one or more techniques include communication based on the type of virtual service protocol associated with each of the service pods, such as http service-pod, FTP-service pod or JMS service pod.

In an embodiment of the present invention, number of crossbar switches 112 for providing communication between the one or more service pods 110 may be selected based on the functionality and coverage desired from one or more virtual services. In an exemplary embodiment of the present invention, the number of crossbar switches 112 may be selected based on a total number of virtual services, associated service-pods 110 and number of service pods frequently switching from one mode to another mode. The one or more modes associated with each service pod 110 are explained later in the specification.

In an exemplary embodiment of the present invention, one crossbar switch 112 may be configured to interface with two or more service pods 110 at a given point of time to provide inter service pod communication. In another embodiment of the present invention, two or more crossbar switches 112 may be configured to interface with same service pod 110 at a given point of time.

Further, the one or more crossbar switches 112 are configured to receive data associated with each of the one or more service pods 110 registered with said one or more crossbar switches 112. The data associated with service pods may include but is not limited to service pod ID, request data, response data, availability status, load, operating condition and run time. The implementation of crossbar switches 112 between the one or more service pods 110 provides flexibility, and relatively greater scalability. Each of the one or more crossbar switches 112 is configured to manage traffic between two or more service-pods 110 using a fabric access table, without affecting traffic between other service pods. The crossbar switch 112 implements push-pull notification services between the one or more service pods 110 in order to provide voluntary and asynchronous communication. In operation in an exemplary embodiment of the present invention, each of the one or more crossbar switches 112 is configured to generate a fabric access table as explained later in the specification. In an exemplary embodiment of the present invention, the fabric access table comprises information including, but not limited service host, Transport/protocol Name, list of destination service pods registered with one or more crossbar switch 112, default crossbar switch 112, one or more crossbar switches 112 managing network fabric. Each of the crossbar switch 112 is configured to select an appropriate one or more service pods 110 to complete one or more incoming requests based on the mode in which the one or more service pods 110 are operating. Further, each of the one or more crossbar switches 112 maintains a system-meta-data of the selected one or more service pods 110 and establishes a permanent SSL connection with selected one or more service pods in order to communicate and complete incoming requests. Each crossbar switch 112 is configured to retrieve and update data from the one or more service pods 110 to update the fabric access table after completion of one or more incoming requests.

In various embodiments of the present invention, the service-pod manager 114 interfaces with one or more crossbar switches 112 to retrieve data associated with one or more service pods 110 registered with respective crossbar switch 112. In another embodiment of the present invention, the service-pod manager 114 interfaces directly with the one or more service pods 110. In an embodiment of the present invention, the service pod manager 114 provides a user interface configured to manage one or more functions associated with one or more service pods 110 registered with one or more crossbar switches 112. The one or more functions may include, but are not limited to starting and stopping of service pods 110, and configuring parameters associated with service pods 110. In an exemplary embodiment of the present invention, the parameters associated with a service pod 110 may include, but are not limited to logging configuration, network ports, external data, request response pairs, and request routing configurations.

In an embodiment of the present invention, the service pod manager 114 is implemented as a web portal which allows a user to view status of one or more service pods 110, manage one or more functions associated with the one or more service-pods 110, where the service pods are registered with one or more crossbar switches 112 interfacing with the service pod manager 114. In an exemplary embodiment of the present invention, the service pod manager 114 can be deployed in the virtual service subsystem 106 in isolation with the one or more service pods 110 and the one or more crossbar switches 112.

In various embodiments of the present invention, each service pod 110 is a self-learning and self-managed engine configured to automatically monitor one or more live services 104'*a*, 104'*b* . . . 104*n*, analyze and record live service behavior and responses, generate virtual service data associated with respective live services 104'*a*, 104'*b* . . . 104'*n* based on recorded behavior and responses, route incoming service requests to appropriate live services and provide one or more virtual services emulating one or more live service 104'*a*, 104'*b* . . . 104'*n*, respectively.

In various embodiments of the present invention, the one or more service pods 110 are configured to record responses from the corresponding live services 104'*a*, 104'*b* . . . 104'*n* to generate virtual service data. The one or more service pods 110 are configured to generate and update virtual service data associated with corresponding live services 104'*a*, 104'*b* . . . 104'*n* to provide one or more virtual services emulating one or more live service 104'*a*, 104'*b* . . . 104'*n*, respectively. In particular, the service pod 110 is configured to monitor, analyze and record behavior and responses generated by one or more live services to complete one or more requests initiated by one or more client applications 102*a*, 102*b* . . . 102*n* to generate corresponding virtual service data.

Further, each service pod 110 is configured to host one or more virtual services without the need of a physical server using a network node process. In another embodiment of the present invention, the one or more service pods 110 are configured to host a plurality of virtual services. In an exemplary embodiment of the present invention, the network node process can be implemented on any workstation using windows, Linux, UNIX or any other operating system. In an exemplary embodiment of the present invention, the one or more virtual services may include, but are not limited to http, JMS, JDBC, FTP, SOAP, REST, FIX, LDAP and RMI.

In an exemplary embodiment of the present invention, each of the one or more service pods 110 may be configured to host multiple virtual services associated with same protocol type. In another exemplary embodiment of the present invention, the one or more service pods 110 may be configured to host same type of virtual service or different version of same virtual service.

In an embodiment of the present invention, each of the one or more service pods 110 deploys respective plurality of virtual services on the same host. In an exemplary embodiment of the present invention, the plurality of virtual services associated with the same service pod 110 may be grouped to work together to produce desired results, for example grouping payment service with an invoice service. The plurality of virtual services in a given service pod may share same or different network namespace and port space. In an embodiment of the present invention, hosting the plurality of virtual services by respective service pods 110 over the same host may be accomplished by assigning respective ports to each of the one or more virtual services.

In another embodiment of the present invention, in case one or more ports are shared between the plurality of virtual services, each of the plurality of virtual services sharing the same port are provided respective service URLs and share the same network namespace. Further, each of the one or more service pods 110 hosting one or more virtual services is configured to manage pool of objects necessary for functioning of each of the associated one or more virtual services on the same port while not interfering with memory, objects and data of each other. Each of the one or more service pods 110 is configured to allocate and assign a portion of memory to given virtual service for each process thread. In an exemplary embodiment of the present invention, JVM level critical section and semaphores are used for managing one or more virtual services sharing the same port. In another exemplary embodiment of the present invention, any other computer programming languages may be used for managing one or more virtual services sharing the same port. In an exemplary embodiment of the present invention, the one or more service pods 110 are configured to provide default threads such as http/JMS/JDBC or any other protocol specific threads and respective thread-pool size to the associated one or more virtual services.

Further, each of the one or more service pods 110 is self-sufficient, and creates its own in-memory data store in the memory 118 of the respective workstations 106 to store required-data necessary for functioning of associated one or more virtual services. In an embodiment of the present invention, the plurality of virtual services hosted by one or more service pods 110 are connected via an elastic network fabric technique to facilitate intra-pod and inter-pod communication, ease of data-delivery, management of virtual services and flexibility.

In an embodiment of the present invention, each of the one or more service pods 110 comprises a pod-Shadow unit (not shown) configured to automatically manage and recover the corresponding one or more service pods 110 in case of failure or maintenance of respective workstation 106. The pod-Shadow unit is configured to create and destroy instances of service-pods as needed.

The pod-Shadow unit is configured to provide high level data-encapsulation to hide respective service pod instances and data from the rest of the network fabric to provide efficient abstraction. In an exemplary embodiment of the present invention, high level data-encapsulation may be a derived form of Cheshire Cat or Compiler Firewall idiom.

In an embodiment of the present invention, pod-shadow unit is configured to provide a unique virtual service identifier to each of the one or more virtual services hosted by respective service pods 110. The unique virtual service identifiers enables one or more service pods 110 to identify a virtual service and its details to complete incoming service requests. The identifier technique as explained above is extremely flexible and supports multiple instances of same virtual services on a given single service pod 110 or multiple service pods 110.

In an embodiment of the present invention, the plurality of service pods 110 interface with each other and the service pod manager 114 via the one or more crossbar switches 112 using elastic network fabric technique. In another embodiment of the present invention, the plurality of service pods 110 interface directly with the service pod manager 114. In another embodiment of the present invention, each service pod 110 can be deployed in isolation with other service pods 110, crossbar switches 112 and service pod manager 114 on the virtual service subsystem 106. In another embodiment of the present invention, each service pod 110 may be connected to an external database, a message queue, a network location or a FTP location, trade-exchange servers etc.

In an embodiment of the present invention, the elastic network fabric technique includes generating a system-meta-data using a computation technique via the one or more crossbar switches 112. In an exemplary embodiment of the present invention, the system-meta-data may include, but is not limited to list of service pods, list of virtual services, list of service pods registered with a crossbar switch, list of service pod modes, and a fabric access table.

In an embodiment of the present invention, the computation techniques includes determining by the one or more crossbar switches 112 a total number of service pods 110 associated with each of the at least one virtual service subsystem 106*a* to generate a list of service pods 110:

SP={SP1, SP2, SP3, SP4, . . . , SPp} where, p is total number of Service pods

Further, the computation technique includes generating a list of virtual services (referred to as end-points) managed by each service pod 110 by computing a total number of end-points associated with each service pod 110:

$E(SP_p)$={E1, E2, . . . , En} where, n is total number of end-points managed by service pod p.

The computation technique, further includes generating a list of service pods 110 registered with a crossbar switch 112 by evaluating a number of service pods 110 registered with a crossbar switch 112.

SCS={SCS1, SCS2, . . . SCSc} where, c is total number of Soft Crossbar switches

SCS(c)={SP1, SP2, . . . SPd} where, d is total number of service pods registered with given SCS-c The computation technique, further includes generating a list of service pods 110 modes by evaluating total number service pods mode.

List of Service pods Modes

SPM={SPM1, SPM2, . . . SPMm} where, m is total number of service pod modes

The computation technique, further includes generating a list of service pods 110 operating in a given mode out of the various modes by evaluating total number of service pods 110 in operating in a given mode.

Service pods 110 operating in a given Mode SPM(m)={SP1, SP2, . . . SPk} where, m is the service pod Mode and k is total number of service pods in given mode m.

The computation technique, further includes generating a fabric access table via a crossbar switch 112 based on the list of virtual services managed by each service pod 110, list of service pods registered with given crossbar switch 112 and list of service pods 110 in a given mode.

FaT(SCS(c))={FaT1, FaT2, . . . , FaT(t)} where, t is total number of FaTs for given number of services pods registered with given SCS-c FaT(t)={SPM(m), E(SPp), SCS(c)}

Finally, the computation technique, includes generating a list of pod-clusters available with a crossbar switch.

PCluster(c)={PClst1, PClst2, . . . , PClsts}

PClst(s)={SP1, SP2, . . . , SPx} where, s is total number of pod-clusters formed/present at given SCS-c x is total number of services pods present in given with given pod-cluster-s.

In an embodiment of the present invention, each of the one or more crossbar switches 112 provides system-metadata to all registered service pods 110. The one or more service pods 110 registered with the one or more crossbar switches 112 analyzes the system-meta-data and updates the system-meta-data with required data. The updated data is transmitted back to the one or more crossbar switch 112 to update the Fabric Access Table (FaT). The system metadata enables one or more crossbar switches 112 to select appropriate service pods 110 and provide communication between appropriate service pods 110 to complete incoming requests from one or more clients applications 102*a*, 102*b* . . . 102*n*. In particular, cascading of data enables a service pod 110 to communicate and route requests to any other service pod which is not directly linked via corresponding crossbar switch 112, resulting in increased flexibility. In an embodiment of the present invention, updating fabric model is an incremental process and a persistent data fabric access table is maintained by the one or more crossbar switches 112. In various embodiments of the present invention, switching off the one or more crossbar switches 112, does not affect the function of the one or more registered service pods, thereby preventing any downtime.

In various embodiments of the present invention, the one or more service pods 110 are configured to receive one or more service requests from the one or more client applications 102*a*, 102*b* . . . 102*n*. The one or more service pods 110 are configured to analyze the type of service requests and determine the availability of the appropriate one or more live services 104'*a*, 104'*b* . . . 104'*n* to respond to the one or more services. If the appropriate live service is available the service pod 110 forwards the service request to the appropriate live service 104'*a*, 104'*b* . . . 104'*n* and records the behavior and response of the live service to update virtual service data associated with said live service. If the appropriate live service is unavailable, the service pod 110 determines if the service pod 110 is configured with the appropriate virtual service to complete the initiated request. If the appropriate virtual service is available, the service pod 110 responds to the requests and maintains a record of the transaction in a database (not shown). Further, if the appropriate virtual service is unavailable the service pod 110 forwards the service requests to other service pods 110 in the network via the one or more crossbar switches 112.

The one or more service pods 110 are configured to reject the excess incoming service requests (fail-fast) by using a dynamic request-Queue with a bounded capacity. In an exemplary embodiment of the present invention, the capacity associated with maximum request-queue length is determined based on acceptable no-response time. For example, the queue capacity can be set as 60*100=6000 to allow a given service pod to recover from excessive load. If the queue capacity is set to an extremely low value, then the frequency of request-rejection will increase. The performance of one or more service pods 110 is directly proportional to hardware of the workstation 106 on which the service pod 110 is deployed.

Each service pod 110 is configured to operate in one or more modes at a given time. In an exemplary embodiment of the present invention, the one or more modes include but are not limited to deployment mode, response mode, delegation mode, proxy mode, cluster mode and load balancer mode.

In an embodiment of the present invention, each of the one or more service pods 110 are configured to operate in the deployment mode. In operation, in the deployment mode, each service pod 110 voluntarily sends a register request to one or more crossbar switches 112. Further, the one or more service pods 110 shares initialization data with the crossbar switches 112 upon successful acknowledgement. The deployment mode allows the one or more crossbar switches 112 to receive all dynamic run-time data associated with one or more service pods 110 to create an elastic network fabric.

In an embodiment of the present invention, the one or more service pods 110 operating in the response mode are configured to process incoming requests from the one or more client applications 102*a*, 102*b* . . . 102*n* using a second set of rules. In an embodiment of the present invention, the second set of rules include validating a given end-point (virtual service) URL associated with a virtual service hosted by a service pod 110 for correctness. If the end-point URL is valid the appropriate service pod 110 responds to the incoming request. Further, the data associated with completion of requests is transmitted to the crossbar switch 112. In an exemplary embodiment of the present invention, the data associated with successful completion of requests includes, but is not limited to endpoint URL, request type, response type, request and response payload, and service pod ID. If the end-point URL is invalid, then the one or more service pods operate in delegation mode.

In an embodiment of the present invention, the one or more service pods 110 operating in the delegation mode are configured to process incoming requests from the one or more client applications 102a, 102b . . . 102n using a third set of rules. In an embodiment of the present invention, the third set of rules includes determining by the service pod 110 operating in delegation mode, if the end-point URL is associated with another service pod 110 in the network fabric. If the end-point URL is associated with another service pod 110 the incoming request is routed to said another service pod 110. Further, the service pod 110 operating in delegation mode updates the routing table via crossbar switch 112 and transmits the data associated with completion of requests to the crossbar switch 112. As described above, the data associated with completion of requests includes, but is not limited to endpoint URL, request type, response type, request and response payload, and service pod ID.

In an embodiment of the present invention, the one or more service pods 110 operating in the proxy mode are configured to process incoming requests from the one or more client applications 102a, 102b . . . 102n using a fourth set of rules. In an exemplary embodiment of the present invention, the fourth set of rules include routing the incoming request to the end-point URL directly without validation. In operation, in an exemplary embodiment of the present invention, the one or more service pods 110 operating in the proxy mode are configured to act as proxy components similar to an http-proxy and forwards incoming service requests to appropriate live service endpoints. For instance, for an http URL such as http://10.223.16.40/paymentgateway/, the service pod 110 receiving the incoming request is configured to forward the incoming request to the URL 10.223.16.40 associated with one of the dependency components 104a, 104b . . . 104n. In particular, the one or more service pods 110 operating in proxy mode do not evaluate validity of the URL based on the following conditions: whether the URL is associated with virtual or live service, whether the URL is associated with any of the service pods 110 available the network. Further, if the request is successfully completed the service pod 110 operating in the proxy mode updates the routing table via crossbar switch 112 and transmits the data associated with successful completion of requests to the crossbar switch 112. As described above, the data associated with completion of requests includes, but is not limited to endpoint URL, request type, response type, request and response payload, and service pod ID.

In an embodiment of the present invention, the service pod 110 operates in cluster mode if more than one service pod 110 is configured with same type of virtual service or different version of same virtual service. In the cluster mode all the service pods 110 configured with same type of virtual service or different version of same virtual service acts as a fabricated-virtual-service hereinafter referred to as Pod-cluster. Further, if the service pod 110 which receives a request from the one or more client applications 102a, 102b . . . 102n (is unable to provide a valid service response, said load balancer service pod redirects the service requests to another service pod 110 in the Pod-cluster. The cluster mode enables N number of same virtual services to form a grid to serve the incoming request. Further, the data associated with completion of requests is transmitted to the crossbar switch 112. As described above, the data associated with completion of requests includes, but is not limited to endpoint URL, request type, response type, request and response payload, and service pod ID.

In an embodiment of the present invention, the one or more service pods 110 operating in the load balancing mode are configured to process incoming requests from the one or more client applications 102a, 102b . . . 102n using a fifth set of rules. In the load balancing mode, each service pod 110 monitors the availability of other service pods 110 in the network. Further, if the service pod 110 which receives a request from the one or more client applications 102a, 102b . . . 102n (hereinafter referred to as a load balancer service pod) is unable to provide a valid service response within a predefined response time, said load balancer service pod redirects the service requests to another service pod 110 configured with the same virtual service based on a fifth set of rules.

In an exemplary embodiment of the present invention, the fifth set of rules includes selecting a service pod 110 to route incoming request based on thresholds such as hosting same type of virtual service, minimum resource-load, minimum response-time and highest average idle-time. In particular, the fifth set of rules includes determining and selecting one or more service pods 110 which are configured with similar type of virtual services with valid end-points. Further, the fifth set of rules includes determining operating condition of the selected service pods 110 configured with same virtual service or different versions of the same virtual service. In an exemplary embodiment of the present invention, the operating condition of the one or more selected services pods 110 may be evaluated using a continuous test technique. The continuous test technique determines if one or more selected service pods 110 can respond to a mock request generated by the load balancer service pod. The one or more selected service pods which do not provide any response are rejected and the others are selected. The fifth set of rules further includes determining load on each of the selected service pods 110 by evaluating CPU usage, response time and memory. The service pod which is less loaded, has highest idle time and responds in less time is selected for redirecting the requests initiated by the client applications 102a, 102b . . . 102n. The idle time is representative of the time for which the connected Service-Pods are idle. The load balancing mode of the service pod 110 ensures that the load between the one or more service pods 110 is evenly distributed and high performance is maintained at all times.

In another embodiment of the present invention, the virtual service subsystem 106 may be implemented in a cloud computing architecture in which data, applications, services, and other resources are stored and delivered through shared data-centers. In an exemplary embodiment of the present invention, the functionalities of the virtual service subsystem 106 are delivered to the application servers 102 as software as a service (SAAS).

Figure 2:
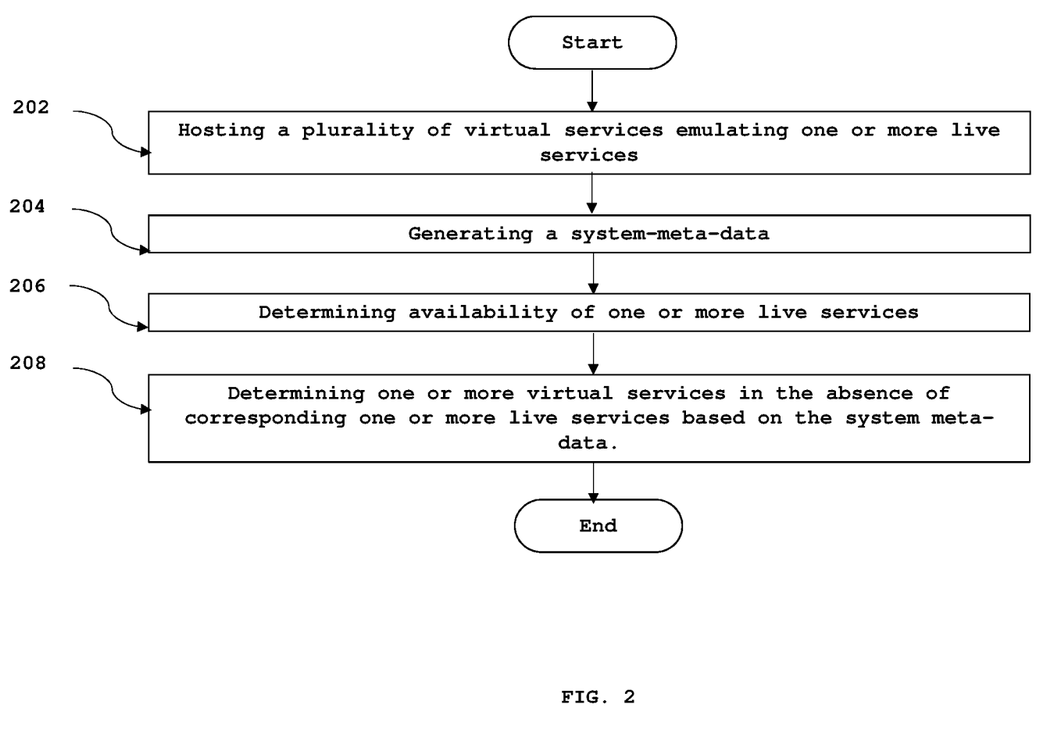
FIG. 2 illustrates a method for providing server-less service virtualization in a distributed computing architecture, in accordance with various embodiments of the present invention.

FIG. 2 illustrates a method for providing server-less service virtualization in a distributed computing architecture, in accordance with various embodiments of the present invention. In particular the present invention provides for service virtualization without the need of a centralized dedicated physical server.

At step 202, a plurality of virtual services emulating one or more live services are hosted. In an embodiment of the present invention, one or more service pods implementable in one or more workstations are provided. The one or more service pods are configured to host the plurality of virtual services emulating the one or more live services hosted by one or more dependency components. In another embodiment of the present invention, a plurality of service pods implementable on one or more workstations are provided. Each of the plurality of service pods are configured to host one or more virtual services emulating the one or more live services. Further, each service pod is configured to operate in one or more modes at a given time. The one or more modes include deployment mode, response mode, delegation mode, proxy mode, cluster mode and load balancer mode.

In operation, in an embodiment of the present invention, behavior of the one or more live services in response to one or more service requests are monitored, analyzed and recorded via one or more service pods. A virtual service data associated with respective one or more live services is generated based on the recorded behavior to provide one or more virtual services emulating the one or more live service. In an exemplary embodiment of the present invention, the plurality of virtual services are selected from a group of virtual services of the type, but is not limited to, http, JMS, JDBC, FTP, SOAP, REST, FIX, LDAP and RMI.

The plurality of virtual services are hosted via the one or more service pods using one or more network ports. In an embodiment of the present invention, the plurality of virtual services hosted by respective service pods are associated with same protocol type selected from, but is not limited to, http, JMS, JDBC, FTP, SOAP, REST, FIX, LDAP and RMI. Further, the plurality of virtual services hosted by respective service pods are of a different version of each other.

The plurality of virtual services sharing the same port are provided same network namespace and separate service URLs. The virtual services associated with each service pod are provided respective thread-pool size and default threads or protocol specific threads. Each of the plurality of virtual services are interconnected via a network fabric technique. In an exemplary embodiment of the present invention, each of the plurality of service pods are interconnected using the elastic network fabric technique via one or more crossbar switches. Further, each of the plurality of virtual services is provided a unique virtual service identifier, wherein the unique virtual service identifier enables identification of one or more virtual services to complete the one or more service requests.

At step 204, a system-meta-data is generated. In an embodiment of the present invention, a system-meta-data is generated using a computation technique. The system-meta-data comprises a fabric access table to enable communication between each of the plurality of virtual services. In an embodiment of the present invention, the one or more cross-bar switches receives a register request from associated one or more service pods. Further, the system-meta-data is generated using the computation technique. In an exemplary embodiment of the present invention, the computation technique comprises determining a total number of service pods associated with each of the at least one virtual service subsystem to generate a list of service pods: SP={SP1, SP2, SP3, SP4, . . . , SPp} where, p is total number of Service pods. The computation technique further comprises generating a list of virtual services managed by each service pod by computing a total number of virtual services associated with each service pod: $E(SP_p)$={E1, E2, . . . , En} where, n is total number of virtual services managed by service pod p.

Further, the computation technique comprises generating a list of service pods registered with each crossbar switch by evaluating a number of service pods registered with a crossbar switch: SCS={SCS1, SCS2, . . . SCSc} where, c is total number of crossbar switches, SCS(c)={SP1, SP2, . . . SPd} where, d is total number of service pods registered with given SCS-c.

Furthermore, the computation technique comprises generating a list of service pod modes by evaluating total number of service pod modes:

List of Service pods Modes SPM={SPM1, SPM2, . . . SPMm} where, m is total number of service pod modes.

Yet further, the computation technique comprises generating a list of service pods operating in a given mode out of the various modes by evaluating total number of service pods operating in the given mode as shown below by the exemplary expression:

Service pods operating in a given mode SPM (m)={SP1, SP2, . . . SPk} where, m is the service pod Mode and k is total number of service pods in given mode m.

Furthermore, the computation technique comprises generating a fabric access table based on the list of virtual services managed by each service pod, list of service pods registered with each crossbar switch and the list of service pods operating in a given mode as shown below by the exemplary expression:

FaT(SCS(c))={FaT1, FaT2, . . . , FaT(t)} where, t is total number of FaTs for given number of services pods registered with given SCS-c, FaT(t)={SPM(m), E(SPp), SCS(c)}.

Finally the computation technique comprises generating a list of pod-clusters available with each crossbar switch as shown below by the exemplary expression:

PCluster(c)={PClst1, PClst2, . . . , PClsts}, PClst(s)={SP1, SP2, . . . , SPx} where, s is total number of pod-clusters formed at given SCS-c, x is total number of services pods present in given with given pod-cluster-s.

In an exemplary embodiment of the present invention, the system-meta-data comprises a list of service pods, a list of virtual services, a list of service pods registered with a crossbar switch, a list of service pod modes and a fabric access table. In an exemplary embodiment of the present invention, the fabric access table comprises information including, but not limited to service host, Transport/protocol Name, list of destination service pods registered with one or more crossbar switch 112, default crossbar switch 112, one or more crossbar switches 112 managing network fabric. In an embodiment of the present invention, the system-meta-data is transmitted to each of the plurality of service pods.

At step 206, availability of one or more live services is determined. In an embodiment of the present invention, availability of one or more live services for completing one or more service requests received from one or more client applications is determined via the one or more service pods hosting corresponding virtual services.

At step 208, one or more virtual services are determined in the absence of corresponding one or more live services based on the system meta-data. In an exemplary embodiment of the present invention, one or more service pods appropriate for completing one or more service requests are selected by the one or more crossbar switches. The one or more crossbar switches selects one or more appropriate service pods based on the system-meta-data. Further, the one or more service requests are forwarded to other service pods if the selected service pod is overloaded. Furthermore, excessive service requests are rejected by the service pods using a dynamic request-Queue with a bounded capacity.

Figure 3:
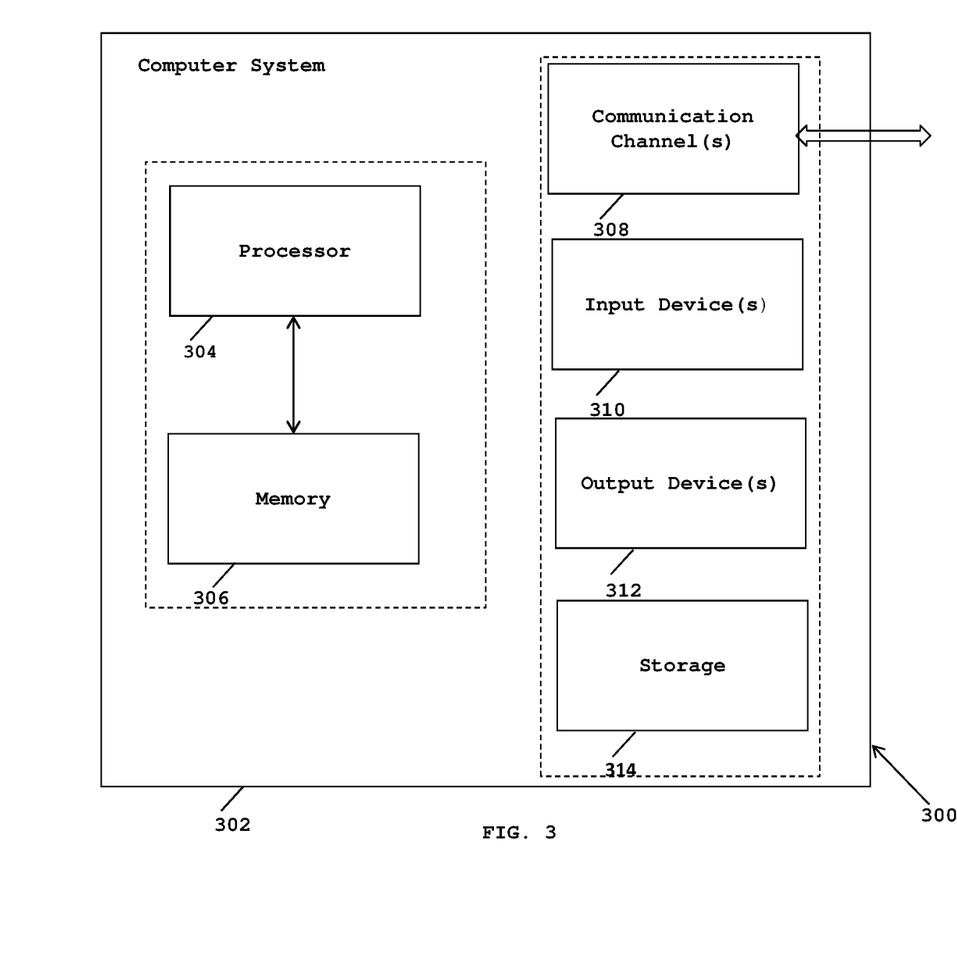
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

I claim:

1. A system for providing server less service virtualisation implementable on one or more workstations in a distributed computing architecture, said one or more workstations interfacing with one or more application servers and one or more dependency components, each of the one or more workstations comprising:
   a memory storing program instructions; a processor configured to execute program instructions stored in the memory; and at least one virtual service subsystem in communication with the processor configured to:
   host a plurality of virtual services emulating one or more live services hosted by one or more dependency components, wherein each of the plurality of virtual services are interconnected via a network fabric technique;
   generate a system-meta-data using a computation technique, wherein the system- meta-data comprises a fabric access table to enable communication between each of the plurality of virtual services;
   determine availability of one or more live services for completing one or more service requests received from one or more client applications via the one or more application servers; and
   determine one or more virtual services in the absence of one or more corresponding live services to complete the one or more service requests based on the system meta-data.

2. The system as claimed in claim 1, wherein the at least one virtual service subsystem comprises one or more service pods in communication with the processor, the one or more service pods configured to host the plurality of virtual services using one or more network ports, further wherein at least one of the service pods is configured to automatically manage and recover the corresponding one or more service pods in case of failure or maintenance of corresponding workstations.

3. The system as claimed in claim 1, wherein the at least one virtual service subsystem comprises a plurality of service pods in communication with the processor, each service pod configured to:
   monitor, analyze and record behavior of the one or more live services in response to the one or more service requests; and
   generate and update virtual service data based on the recorded behavior to provide one or more virtual services emulating the one or more live service, wherein more than one virtual service hosted by respective service pods are associated with same protocol type selected from a group comprising of http, JMS, JDBC, FTP, SOAP, REST, FIX, LDAP and RMI.

4. The system as claimed in claim 3, wherein more than one virtual service hosted by respective service pods are of a different version of each other.

5. The system as claimed in claim 2, wherein the plurality of virtual services sharing the same port have same network namespace and respective service URLs, further wherein the plurality of virtual services sharing the same port are managed by employing JVM level critical section and semaphores.

6. The system as claimed in claims 3, wherein each service pod is configured to provide respective thread-pool size and default threads or protocol specific threads to the associated virtual services.

7. The system as claimed in claim 2, wherein the service pod comprises a pod-Shadow unit configured to create and destroy instances of service-pods; and
provide high level data-encapsulation to hide respective service pod instances and data.

8. The system as claimed in claim 1, wherein each of the plurality of virtual services is provided a unique virtual service identifier, wherein the unique virtual service identifier enables identification of one or more virtual services to complete the one or more service requests.

9. The system as claimed in claim 3, wherein each of the plurality of service pods are interconnected using the elastic network fabric technique, further wherein the elastic network technique includes generating the system-meta-data using the computation technique.

10. The system as claimed in claim 9, wherein the at least one virtual service subsystem comprises one or more crossbar switches in communication with the processor, wherein the one or more crossbar switches are deployed as an independent unit separate from the plurality of service pods, further wherein the one or more crossbar switches interface with one or more service pods, the one or more crossbar switches configured to:
receive data associated with one or more service pods registered with the one or more crossbar switches;
generate the system-meta-data and transmit the system-meta-data to the plurality of service pods registered with one or more crossbar switches, wherein the system-meta- data comprises a fabric access table including service host, protocol name, list of destination service pods registered with one or more crossbar switch, default crossbar switch and one or more crossbar switches managing the plurality of service pods;
select appropriate one or more service pods to complete one or more service requests based on a mode in which the one or more service pods are operating;
provide a gateway to exchange data between the plurality of service pods; and
update the fabric access table after completion of one or more service requests.

11. The system as claimed in claim 10, wherein the computation technique comprises:
determining a total number of service pods associated with each of the at least one virtual service subsystem to generate a list of service pods:
SP={SP1,SP2,SP3,SP4, . . . ,SPp} where, p is total number of Service pods;
generating a list of virtual services managed by each service pod by computing a total number of virtual services associated with each service pod: $E(SP_p)$={E1, E2 . . . ,En} where, n is total number of virtual services managed by service pod p;
generating a list of service pods registered with each crossbar switch by evaluating a number of service pods registered with a crossbar switch:
SCS={SCS1,SCS2, . . . SCSc} where, c is total number of crossbar switches, SCS(c)={SP1,SP2, SPd} where, d is total number of service pods registered with given SCS-c;
generating a list of service pod modes by evaluating total number of service pods mode: List of Service pods Modes SPM={SPM1,SPM2, . . . SPMm} where, m is total number of service pod modes;
generating a list of service pods operating in a given mode out of the various modes by evaluating total number of service pods operating in the given mode: Service pods operating in a given Mode SPM(m)={SP1,SP2, . . . SPk} where, m is the service pod Mode and k is total number of service pods in given mode m;
generating a fabric access table based on the list of virtual services managed by each service pod, list of service pods registered with each crossbar switch and the list of service pods operating in a given mode: FaT(SCS(c))= {FaT1,FaT2, . . . ,FaT(t)} where, t is total number of FaTs for given number of services pods registered with given SCS-c, FaT(t)={SPM(m),E(SPp),SCS(c)} ; and
generating a list of pod-clusters available with each crossbar switch: PCluster(c)={PClst1,PClst2, . . . , PClsts}, PClst(s)={SP1,SP2, . . . ,SPx} where, s is total number of pod-clusters formed at given SCS-c, x is total number of services pods present in given with given pod-cluster-s.

12. The system as claimed in claim 1, wherein the system-meta-data comprises a list of service pods, a list of virtual services, a list of service pods registered with a crossbar switch, a list of service pod modes and a fabric access table.

13. The system as claimed in claim 3, wherein the at least one virtual service subsystem comprises a service pod manager in communication with the processor, wherein the service-pod manager is deployed as a unit separate and independent from the plurality of service pods, the service-pod manager interfaces with the plurality of service pods, the service-pod manager configured to view status of the plurality of service pods and manage one or functions associated with the plurality of service pods.

14. The system as claimed in claim 13, wherein the one or more functions include starting and stopping of one or more service pods, and configuring parameters associated with each of the plurality of service pods, further wherein the parameters associated with a service pod include logging configuration, network ports, external data, request response pairs and request routing configurations.

15. The system as claimed in claim 2, wherein the one or more service pods are configured to reject excessive service requests by using a dynamic request-Queue with a bounded capacity.

16. The system as claimed in claim 9, wherein each service pod is configured to operate in one or more modes at a given time, wherein the one or more modes include deployment mode, response mode, delegation mode, proxy mode, cluster mode and load balancer mode, further wherein the one or more service pods operating in the deployment mode are configured to send a register request to one or more crossbar switches; and share initialization data with the one or more crossbar switches upon successful acknowledgement.

17. The system as claimed in claim 16, wherein one or more service pods operating in the response mode are configured to:
  process one or more service requests from the one or more client applications using a second set of rules, wherein the second set of rules include validating respective end-point URLs associated with one or more virtual services; and
  provide a response to the one or more service requests based on the validity of respective end-point URLs.

18. The system as claimed in claim 17, wherein the one or more service pods operate in the delegation mode if the one or more end-point URLs are invalid, the one or more service pods operating in the delegation mode are configured to:
  process one or more service requests from the one or more client applications using a third set of rules, wherein the third set of rules includes determining an association between the end-point URL with other service pods in a network fabric; and
  routing the one or more service requests to the other service pod in the network fabric on determination of a valid association.

19. The system as claimed in claim 16, wherein the one or more service pods operating in the proxy mode are configured to process one or more service requests from the one or more client applications using a fourth set of rules, wherein the fourth set of rules include routing the one or more service requests to one or more requested end-point URLs without validation.

20. The system as claimed in claim 16, wherein two or more service pods hosting same type of virtual services or a different version of a given virtual service are configured to operate in the cluster mode as a pod-cluster, further wherein the one more or more service requests from the one or more client applications are redirected from one service pod to other service pods associated with the pod-cluster to balance load.

21. The system as claimed in claim 16, wherein the plurality of service pods operating in the load balancing mode are configured to:
  monitor the availability of one or more service pods in a network fabric; and
  process one or more service requests from the one or more client applications using a fifth set of rules, wherein the fifth set of rules includes determining and selecting one or more service pods configured with same type of virtual services with valid end-points; determining operating condition of the selected one or more service pods using a continuous test technique, wherein the continuous test technique includes determining the one or more selected service pods capable of generating a response to a mock request and rejecting the one or more service pods that are unable to generate the response; and
  determining load on each of the selected service pods by evaluating CPU usage, response time and memory, further wherein the service pod with least response time is selected for redirecting the one or more service requests.

22. The system as claimed in claim 1, wherein data associated with completion of requests is transmitted to one or more corresponding crossbar switch, further wherein the data associated with completion of requests includes end-point URL, request type, response type, request and response payload, and service pod ID.

23. A method for providing server-less service virtualization in a distributed computing architecture, wherein the method is implemented by at least one workstation comprising at least one processor executing program instructions stored in a memory, the method comprising:
  hosting, by a processor, a plurality of virtual services emulating one or more live services hosted by one or more dependency components, wherein each of the plurality of virtual services are interconnected via a network fabric technique;
  generating, by the processor, a system-meta-data using a computation technique, wherein the system-meta-data comprises a fabric access table to enable communication between each of the plurality of virtual services;
  determining, by the processor, availability of one or more live services for completing one or more service requests received from one or more client applications via the one or more application servers; and
  determining, by the processor, one or more virtual services in the absence of one or more corresponding live services to complete the one or more service requests based on the system meta-data.

24. The method as claimed in claim 1, wherein hosting the plurality of virtual service comprises:
  monitoring, analyzing and recording behavior of the one or more live services in response to the one or more service requests; and
  generating and updating virtual service data based on the recorded behavior to provide one or more virtual services emulating the one or more live service.

25. The method as claimed in claim 23, wherein the plurality of virtual services are selected from http, JMS, JDBC, FTP, SOAP, REST, FIX, LDAP and RMI.

26. The method as claimed in claim 23, wherein the plurality of virtual services sharing a same port have same network namespace and respective service URLs, further wherein the plurality of virtual services sharing the same port are managed by employing JVM level critical section and semaphores, further wherein each of the plurality of virtual services have respective thread-pool size and default threads or protocol specific threads.

27. The method as claimed in claim 23, wherein the plurality of virtual services are hosted by one or more service pods interconnected by one or more crossbar switches using the elastic network fabric technique, further wherein the elastic network technique includes generating the system-meta-data using the computation technique.

28. The method as claimed in claim 27, wherein the computation technique comprises:
  determining a total number of service pods associated with each of the at least one virtual service subsystem to generate a list of service pods: SP={SP1,SP2,SP3, SP4, . . . ,SPp} where, p is total number of Service pods;
  generating a list of virtual services managed by each service pod by computing a total number of virtual services associated with each service pod: $E(SP_p)$={E1, E2, . . . ,En} where, n is total number of virtual services managed by service pod p;
  generating a list of service pods registered with each crossbar switch by evaluating a number of service pods registered with a crossbar switch: SCS={SCS1, SCS2, . . . SCSc} where, c is total number of crossbar switches, SCS(c)={SP1,SP2, . . . SPd} where, d is total number of service pods registered with given SCS-c;
  generating a list of service pod modes by evaluating total number of service pods mode: List of Service pods Modes SPM={SPM1,SPM2, ... SPMm} where, m is total number of service pod modes;

generating a list of service pods operating in a given mode out of the various modes by evaluating total number of service pods operating in the given mode: Service pods operating in a given Mode SPM(m)={SP1,SP2, ... SPk} where, m is the service pod Mode and k is total number of service pods in given mode m;

generating a fabric access table based on the list of virtual services managed by each service pod, list of service pods registered with each crossbar switch and the list of service pods operating in a given mode: FaT(SCS(c))={FaT1,FaT2, ... ,FaT(t)} where, t is total number of FaTs for given number of services pods registered with given SCS-c, FaT(t)={SPM(m),E(SPp),SCS(c)} ; and generating a list of pod-clusters available with each crossbar switch: PCluster(c)={PClst1,PClst2, ... , PClsts}, PClst(s)={SP1,SP2, ... ,SPx} where, s is total number of pod-clusters formed at given SCS-c, x is total number of services pods present in given with given pod-cluster-s.

29. The method as claimed in claim 23, wherein the system-meta-data comprises a list of service pods, a list of virtual services, a list of service pods registered with a crossbar switch, a list of service pod modes and a fabric access table.

30. A computer program product comprising:

a non-transitory computer-readable medium having computer-readable program code stored thereon, the computer-readable program code comprising instructions that, when executed by a processor, cause the processor to:

host a plurality of virtual services emulating one or more live services hosted by one or more dependency components, wherein each of the plurality of virtual services are interconnected via a network fabric technique;

generate a system-meta-data using a computation technique, wherein the system-meta-data comprises a fabric access table to enable communication between each of the plurality of virtual services;

determine availability of one or more live services for completing one or more service requests received from one or more client applications via the one or more application servers; and determine one or more virtual services in the absence of one or more corresponding live services to complete the one or more service requests based on the system meta-data.

* * * * *